Dec. 19, 1933.   W. E. SMITH   1,940,331
AUTOMATIC ARC WELDING DEVICE
Filed Aug. 7, 1930   4 Sheets-Sheet 1

INVENTOR
William E. Smith.
BY
Harness, Dickey, Pierce & Haun.
ATTORNEYS.

Dec. 19, 1933.  W. E. SMITH  1,940,331
AUTOMATIC ARC WELDING DEVICE
Filed Aug. 7, 1930    4 Sheets-Sheet 2
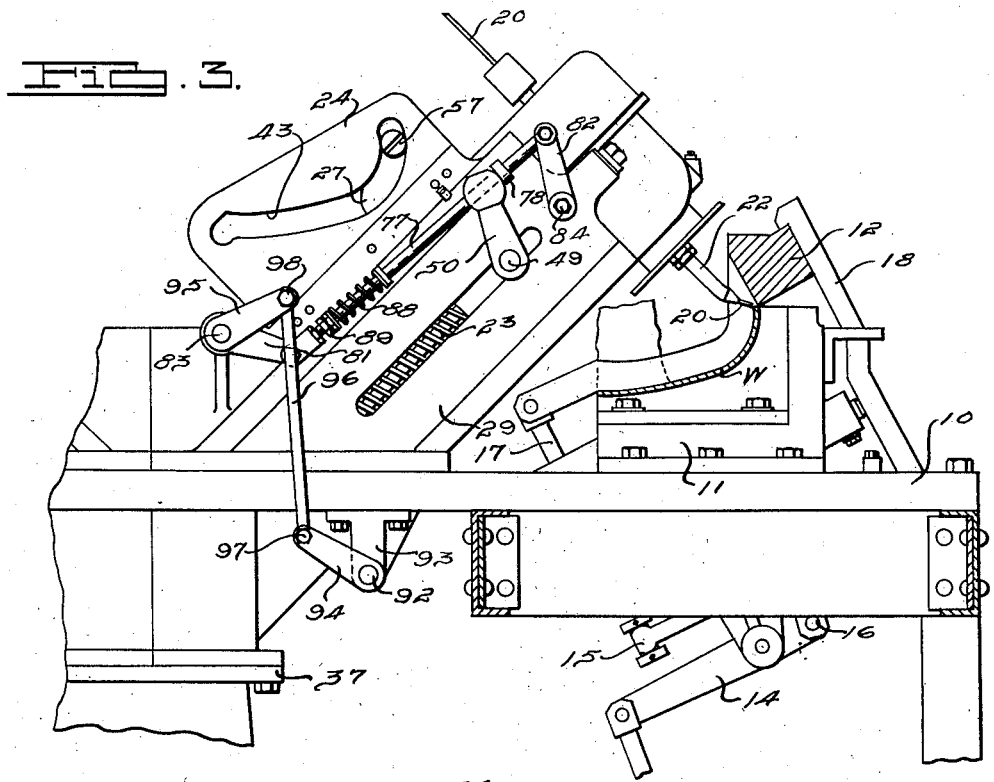
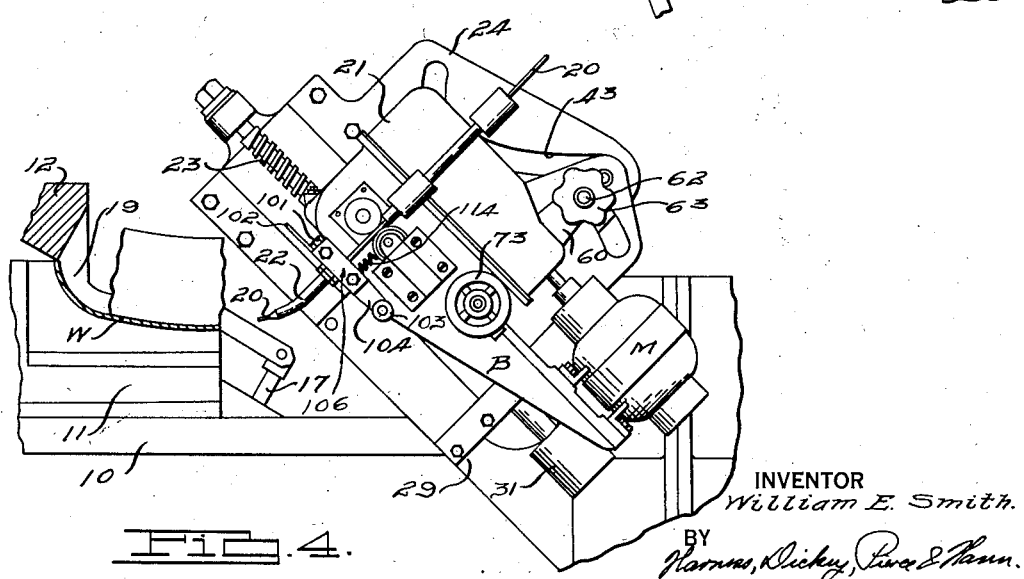
INVENTOR
William E. Smith.
BY
ATTORNEYS.

Dec. 19, 1933.     W. E. SMITH     1,940,331
AUTOMATIC ARC WELDING DEVICE
Filed Aug. 7, 1930     4 Sheets-Sheet 3

INVENTOR
*William E. Smith.*
BY
*Harness, Dickey, Pierce & Harness.*
ATTORNEYS.

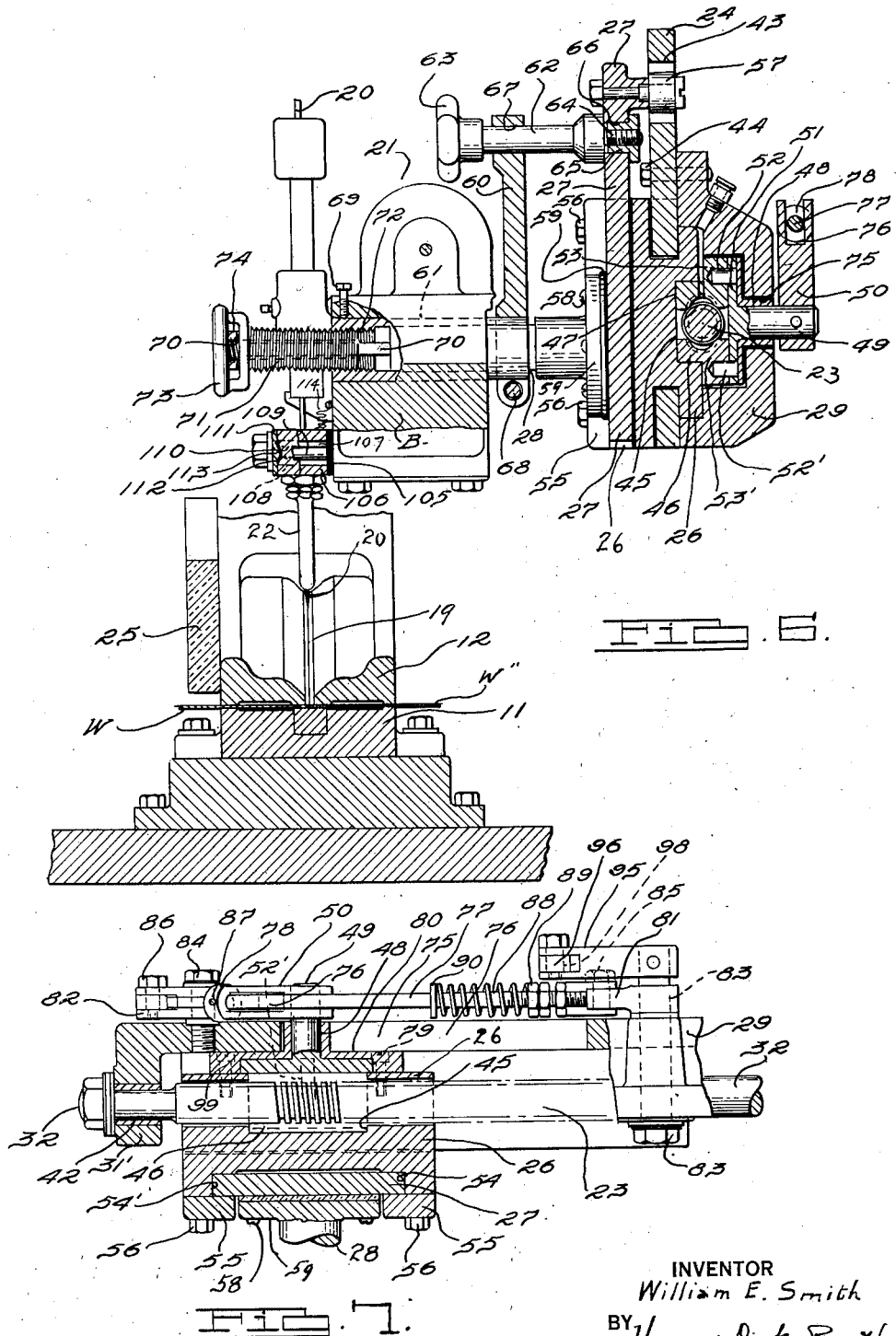

Patented Dec. 19, 1933

1,940,331

UNITED STATES PATENT OFFICE 1,940,331

AUTOMATIC ARC WELDING DEVICE

William E. Smith, Detroit, Mich., assignor to The Murray Corporation of America, a corporation of Delaware Application August 7, 1930. Serial No. 473,649

17 Claims. (Cl. 219—8)

Various types of special arc welding heads being now obtainable, each including means automatically to so control the advance of a conductive wire or rod, serving as an electrode, as to maintain a substantially uniform welding arc during a movement of relative traverse between said head and flat work parts that are to be united, it is an object of this invention to provide means favorable to the use of such welding heads also in the uniting of concave or other shaped metallic parts, such as, for example, sheet metal parts curved in a plane substantially at right angles to the surfaces thereof; and preferred embodiments of the invention, adapted simultaneously to weld two joints by substantially opposite and symmetrical movements of a pair of heads provided with inclined guides, may include special "carriages" provided with replaceable cams and with cooperating parts adapted to impart a to-and-fro motion to said heads in general conformity with the configurations of said parts, during such movement of traverse.

To bring a welding head and weld rod to an out-of-the-way position at will, it is a further object of this invention to provide, in an organization of the general character referred to, means permitting a tilting of the mentioned head relatively to a carriage having an inclined or other predetermined path of translatory movement,— said head and said carriage being preferably provided with means for retaining the same in a predetermined angular relationship when desired, as well as with means for varying said relationship.

It is a further object of the invention to provide, in connection with a carriage in the form of a main slider provided with threaded or other means for imparting translatory motion thereto in the general direction of a line of intended juncture between curved parts, intermediate supporting means including an additional element, slidable in the plane of curvature of said line; said head may be secured to said additional slider by means permitting the mentioned pivotal movement; and said carriage may be provided with a replaceable cam adapted to impart a to-and-fro motion to said additional slider, to cause said head to advance in a line substantially parallel with the curved line of junction between said work parts.

Although the invention is herein illustrated as applied to the welding of a pair of symmetrically disposed top quarter panels to a rear or back quarter panel, said panels being inwardly concave and the curvature of the lines of junction amounting to about 90 degrees, it should be understood that the principles of the invention render the same somewhat broadly applicable in the provision of curved linear joints between similarly convex or concave edges of sheet metal parts, or the like; and preferred embodiments of the invention may include, for use in conjunction with mentioned features or independently thereof, a welding head provided with a flexibly mounted guide for the terminal portion of a welding rod or wire, and "fine adjustment" means for varying the inclination of said guide favorably to the maintenance of a desired distance, rate of advance and/or angular relationship between said rod or wire and the work parts notwithstanding the curvature of the latter, as, in a plane common to the joint between said parts and said wire or rod.

Other objects of the present invention, including the provision of cam means for effecting or guiding any or all of the mentioned relative movements, said cam means being variable by a substitution of removable parts according to the configuration of work in hand and such as to assure the completion of sound welds at a more rapid rate and with less liability to mishap or defective output than heretofore, may be best appreciated from the following description of an illustrative embodiment of the invention, taken in connection with the appended claims and the accompanying drawings.

Fig. 3 is a rear view, in elevation, of the structure illustrated in Fig. 2.

Fig. 4 is a front view, in elevation, of the structure illustrated in Fig. 2.

Fig. 6 is a sectional view, somewhat diagrammatic, taken substantially as suggested by the line 6—6 of Fig. 5.

Fig. 7 is an additional sectional view, taken substantially as indicated by the line 7—7 of Fig. 5.

Each view assumes some parts to have been broken away; and Fig. 4 shows one welding head, including a motor M on a bracket B, to have been tilted away from the work W.

Figure 1:
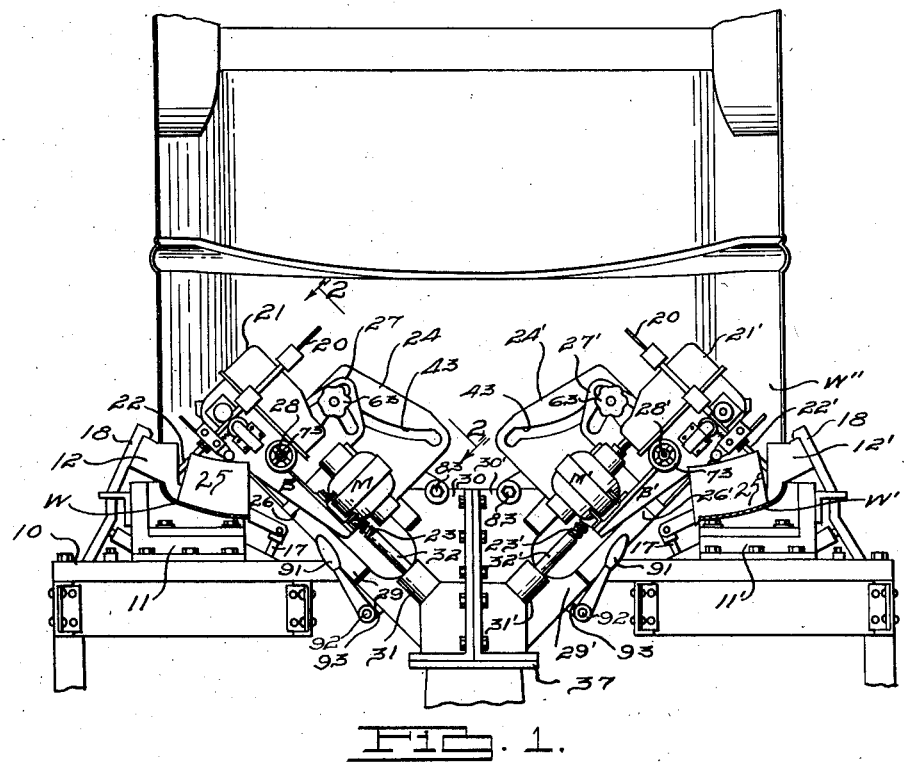
Fig. 1 is a perspective view, showing an embodiment of the invention as employed in securing a pair of top quarter panel elements simultaneously to a back quarter panel element, to which additional panel elements have already been secured.
Figure 2:
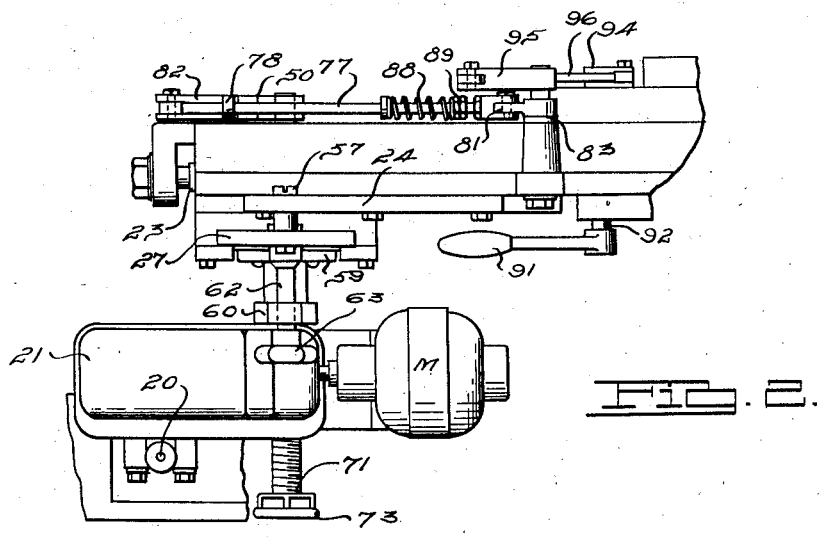
Fig. 2 is a broken, enlarged plan view of a portion of the structure illustrated in Fig. 1.
Figure 5:
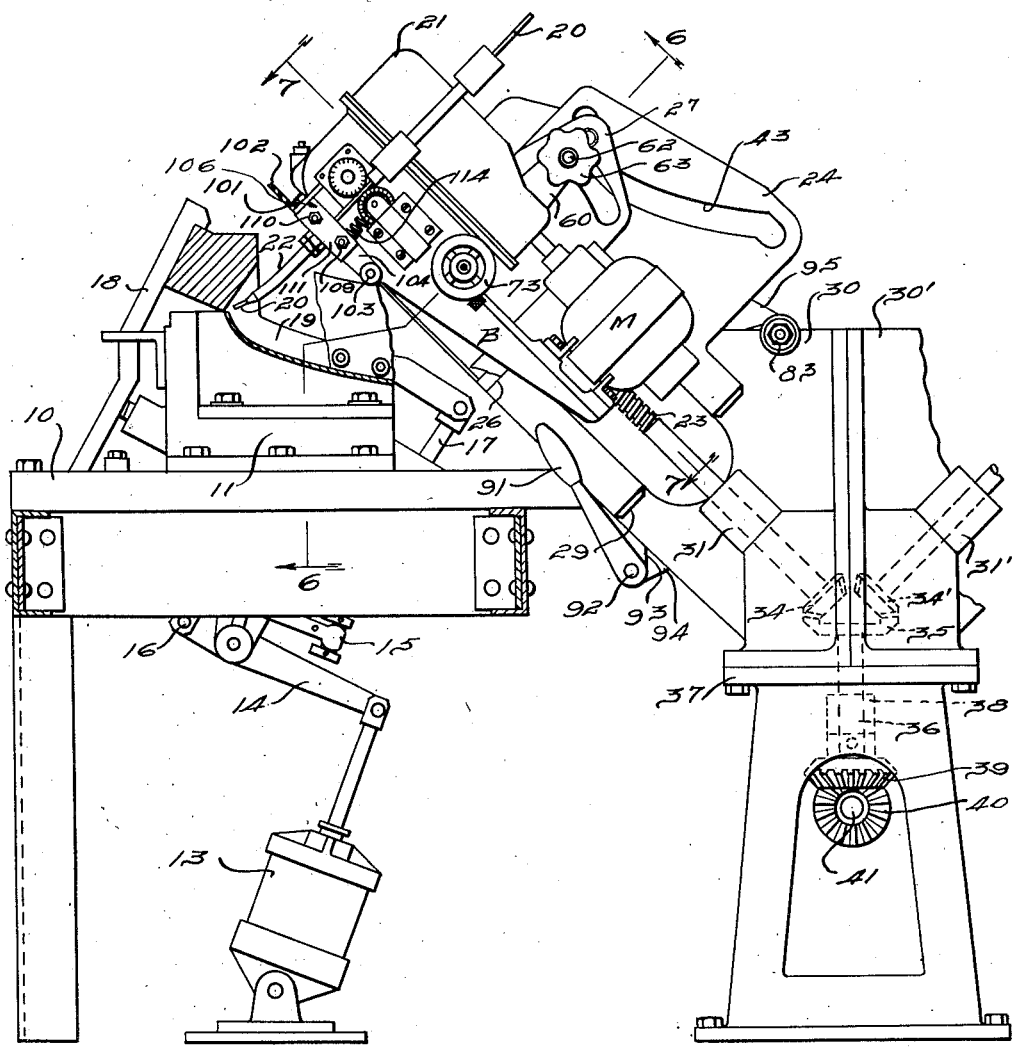
Fig. 5 is an elevational view, with parts in section and parts broken away, corresponding to the showing in the left lower portion of Fig. 1.

Referring first to the more general features of the invention, a bench or frame 10 is shown as supporting fixed clamp elements 11, 11', with which movable clamp elements 12, 12' (shown as manipulable by a hydraulic means 13) may cooperate in the retention of work parts W, W' and W'' in a manner suitable to the welding of the latter either by manual or automatic means. There need be no novelty in the construction or mode of use of the respective elements 10-13 inclusive or in a system of levers 14, 15, and links 16 and 17, shown as cooperating with a dog 18 in applying a clamping pressure to the movable clamp element 12; nor in the provision, in said element, of a slot 19, enabling a weld rod or wire 20 to be brought into an operative relationship with a joint between the mentioned curved work parts; but, in preference to providing for a hand manipulation of the wire or rod 20, the present invention contemplates the employment of one or more welding heads 21, 21', shown as respectively including guides 22, 22' for said wire or rod; and the present invention is directed more particularly to the provision of special means for imparting not only a translatory motion but a to-and-fro motion to each of said heads. This will be understood to give a "hill and dale" effect, rendering the line of advance thereof substantially parallel with the joint between the work parts; and the invention includes also the provision of means permitting or effecting a pivotal motion of said heads or said guides, means such as screws 23, 23', other cams 24, 24' and guide-swinging cams 25, 25' being preferably associated respectively with carriages 26, 26', slides 27, 27' and pivot arms or posts 28, 28', somewhat as shown in Figs. 4-7 inclusive.

As to details, fixed guides 29, 29' for the respective carriages 26, 26' may be provided by a pair of castings 30, 30', serving also to provide bearings 31, 31' for shafts 32, 32' of the mentioned screws 23, 23', inwardly convergent ends of said shafts being provided with means, such as beveled gears 34, 34', for engagement with a common drive gear, 35, upon a vertical or other shaft 36; and the castings 30, 30', if not supported from the bench or frame 10, may rest upon a special standard 37, shown as providing a bearing 38 for the shaft 36. Unless directly driven, the latter may be, in turn, provided with a beveled gear 39, for engagement with a corresponding gear 40, upon a horizontal shaft 41; but it will be understood that any desired alternative means, preferably subject to control by limit switches, may be employed to impart rotation to one or both of the shafts 32, 32'. The latter may have any desired fixed or angular relationship to one another, dependent upon the general direction of the weld line between the work parts; and any desired "follower" means may be employed, in conjunction with a cam such as that provided by the screws 23, 23 to impart a fixed or variable rate of advance to the carriage 26 or 26', in case each carriage is to be mechanically advanced (instead of merely guided) relatively to a cam serving to impart a to-and-fro movement to a welding head.

The guide arms 29, 29' being shown as additionally provided with bearings 42, 42', for the outer end of shafts 32, 32', the respective cams 24, 24', shown as provided with slots 43 (which generally correspond in curvature with the intended weld lines between the work parts) may be secured to said guide arms by means such as screws 44; and, in case a releasable connection is desired between the screws 23, 23' and the carriages 26, 26', each of said carriages being chambered at 45, suitably to receive the cooperating parts 46, 47 of a follower in the form of a split nut, the respective guide arms 29, 29' may serve additionally to provide, as at 48, bearings for short shafts 49. Each of the latter may be provided at its outer end with a slotted operating arm 50 and may be integral, at its inner end, with a plate 51, carrying pins 52, 52', to enter corresponding openings in lugs 53, 53', integral with the respective halves of the mentioned split nut and serving to disengage the same upon a suitable rotation of the short shaft 49.

The respective head-carrying slides 27, 27' being shown as guided, in a direction substantially at right angles to the lines of advance of carriages 26, 26', by means of channels 54', provided in said carriages and completed by means such as plates 55 retained by screws 56, each slide 27, 27' is shown as provided with a cam follower in the form of a roller 57, adapted to enter the corresponding cam slot 43 in a fixed cam plate 24 or 24'; and it will be seen that the to-and-fro movement imparted to a welding head carried directly or indirectly by one of the sliders 27, 27' may be varied by merely substituting a new cam plate or cam plates provided with a slot or slots having the desired configuration, in replacement of the corresponding elements shown herein; and, assuming the pivot posts 28, 28' to be rigidly secured to the sliders 27, 27' (as by means of screws 58, shown as extending through collars 59) an arm 60, shown as secured to a sleeve 61 by which a head 21 or 21' is carried, may be provided with some means (such as a lock bolt 62, outwardly terminating in a handle 63 and provided, at its opposite end, with a threaded extension 64, entering a nut 65 received within an arcuate slot 66 in the slider 27) to establish any desired angular relationship between a head 21 or 21' and a slider 27 or 27' or other mentioned supporting parts.

Each lock bolt 62 may be both rotatably and slidably received within an opening 67 in an arm 60; and each sleeve 61, although held against rotation relatively to either an arm 60 or a head 21 (as by means of a binding screw 68 and a set screw 69) may be provided with means for a lateral adjustment of all parts carried by a sleeve 61, or its equivalent, relatively to a mentioned slider. For example, the post 28, shown as rotatably supporting said sleeve, may be provided with a reduced extension 70, projecting through a tubular adjustment screw 71, which screw is shown as engaging an interior thread provided at 72, near the outer end of the sleeve 61, and as terminating in a handle 73. This may be retained by a nut 74 upon the outer end of the threaded extension 70; but it will be obvious that any desired means might be employed in addition to the handle 73 or in replacement thereof to effect a mechanical adjustment or lateral shifting of a welding head 21 or 21' in case the line of junction between the sheet metal or other parts referred to were such as to require a "weaving" or lateral movement of the electrode wire during the translatory motion thereof and concurrently with or independently of the to-and-fro motion provided for by the described manipulation of the slider 27 or 27'.

It will be obvious that various alternative cams might be substituted for uniform or non-uniform screws 23, 23'; and that the mentioned split nut functions as cam-engaging follower or finger adapted to impart movement to the carriages 26, 26'. In case the described nut-splitting organizations are provided with short shafts 49 (shown as movable longitudinally of slots 75 provided in the arms 29, 29') actual welding being then presumably effected during movement of said carriages in but one direction, if provided upon said shafts the arms 50 may obviously be manipulated by either manual or mechanical means. For example, to provide remote control means therefor, said arms being shown as each provided with a notch 76 through which extends a rod 77 carrying a tappet 78, and each bearing sleeve 48 for a short shaft 49 being shown as secured to a slider carriage 26 or 26' by screws 79 extending through a plate 80, with which a bearing sleeve may be integral, each rod 77 may be secured by means such as short arms 81, 82, pivoted at 83, 84 to guide arms 29, 29', the ends of said rods being in turn pivoted to said short arms by bolts 85, 86.

Tappet 78, whether or not provided with an interior thread, may be locked in an adjusted position by means such as a screw 87; and means such as a coil spring organization 88, adjustable by a nut 89 and completed by a washer 90 may serve not only to check the descent of each carriage 26, 26', and all parts carried thereby, in case of a reliance upon a gravity return, but to restore rod 77 and various other parts to an initial position permitting a repetition of the described movements, subject to initiation and/or discontinuance by means such as a suitable electric switch and/or a manual lever. For example, a lever 91 is shown as pivoted at 92 upon a bracket 93 and as including an arm 94. Assuming each of the mentioned short arms 81 to be rigidly related to similar arm 95, as by securing said arms upon the bolts 83 in such manner that the latter serve as rock shafts, links 96 may be so secured, as by pivots 97 and 98, to the arms 94 and 95 as to control the position of rod 77, and thereby the tilting of the arms 50 and the engagement of the mentioned nut, or that of an equivalent follower element adapted to impart translatory movement to one of the carriages 26, 26'.

Whether or not the castings 30, 30' and/or the shafts 32, 32' are so constructed as to permit variation in the inclination thereof, it will be seen that an engagement of an arm 50 with a tappet 78, or its equivalent, may so rotate the follower-positioning arm as to initiate or discontinue the advance of a carriage 26 or 26'; and that, in case the screws 23, 23' are not each provided with two threads, oppositely inclined in a known manner favorable to a reciprocatory effect, the rotation of the shafts 32, 32' may be discontinued and/or reversed (manually or by automatic means including limit switches) upon the completion of each movement of the carriages 26, 26', an inward movement of the carriages 26, 26' being subject to initiation by, for example, such a manipulation of the lever handle 91 as to cause a movement of approach between the split nut element 46, 47, and an opposite procedure being available to initiate outward movement of the carriages 26, 26' after the nuts have been split by engagement of arms 50 with mentioned washers or equivalent tappet elements on rod 77.

The illustrated embodiment of the present invention being directed more particularly to the production of a to-and-fro motion of a welding head or heads during translatory movement thereof, to render the advance of said head substantially parallel with a line of juncture between work parts and to keep a weld rod in a work plane substantially including said line of juncture, it will be obvious that means for producing an additional or fore-and-aft movement of the welding head or the work may be dispensed with unless by reason of an additional curvature or "weave" in said line of junction; but it is nevertheless found advantageous to equip the described welding heads with what may be referred to as "fine adjustments", each including a pair of mentioned cam elements. 25, 25' serving to obviate undue inclination of the welding rod relatively to the work.

The illustrated embodiment of the invention being directed particularly to the simultaneous welding of a pair of top quarter panels to a back quarter panel, these panels are shown as so inverted as to bring the concave interior surfaces thereof upward, favorably to an application of the welding metal to a concealed surface thereof; and an outer portion of each line of juncture between the mentioned panels will be seen to extend substantially vertical and at an angle of substantially 90 degrees to an inner portion thereof. In order that the terminal portion of the weld rod 20 or 20' may nevertheless be at all times disposed at an angle greater than 45 degrees to the mentioned line of juncture, special "fine adjustment" cams 25, 25' may be adjustably or otherwise secured to the movable clamping elements 12, 12'; and each clamping head 21, 21' may include, in replacement of a fixed and conductive delivery or guide element for the weld wire or rod, a pivotally movable guide element 22, provided with a cam follower such as a roller or finger engageable by a cam 25, 25'. The guide element 22 being shown as provided not only with a connection 101 for a conductor 102 but with a cam roller 103 upon a finger 104, and shown as spaced from the main portion of a head 21, or 21' by means of an insulating plate 105, said guide element may be pivotally supported relatively to the head carrying the same by any suitable means. For example, a main conductive block or body 106 comprised in or secured to said guide element may be provided not only with a pair of suitably spaced and ample openings 107, 108, allowing wide clearance for any elements such as bolts 109, 110, employed to support a plate 111, but also with a bearing socket 112, adapted to receive a conical or other bearing element such as a lug 113 provided upon said plate; and said body may be biased, by means such as a spring 114, to an inclined position.

Although the mentioned bolts may then serve to limit pivotal movement of the block 106 and thereby that of the guide element 22, it will be understood that the clearance between the mentioned bolts and the mentioned openings is intended to be sufficient to permit any tilting movement of the said guide that may be required by the configuration of a cam 25, 25' or its equivalent, whether employed to vary the angle of feed of the electrode wire or to effect any other "fine adjustment" incidentally to the translatory advance thereof during welding, no "weave" or fore-and-aft movement of the welding wire being contemplated by the specific configuration of parts illustrated.

The mode of operation of all the features of the present invention having been indicated in connection with the description thereof, it will be understood that, except as they may include or be provided with special cams for the guidance of the tips of welding wires, the described clamping elements, although shaped to conform to the work in hand, need not differ from those heretofore used incidentally to hand welding operations; that any desired mechanical means, independent of the present invention or coordinated therewith, may be used to place and to remove the work parts and/or to manipulate the clamp elements; and that the described organization is especially suitable to a simultaneous welding along a plurality of symmetrical lines of juncture, either electrical or mechanical means being relied on to initiate and to discontinue the requisite translatory motion of the welding head and the resultant operations being so uniform, so reliable and so largely automatic as to assure the rapid production of sound joints and to permit a single operator to manage a plurality of machines of the described character. It should, however, be understood not only that various features of the present invention might be independently employed but also that the respective "heads", including motors M, M' on brackets B, B', are of a known type and that numerous modifications, additional to any suggested herein, might easily be devised by skilled workers, if informed of the foregoing, all without departure from the scope of the present invention, as the latter is indicated above and in the following claims.

What I claim is:

1. In a welding machine suitable for use in joining curved work parts: a welding head; a welding rod supported by said head; means for producing a movement of relative traverse between said head and said work parts in the general direction of the intended line of junction between said parts; and means for producing, in the delivery end of said rod, an additional movement favorable to a desired inclination thereof relatively to said work.

2. In a welding machine suitable for use in joining curved work parts: a welding head; a welding rod supported by said head; means for producing a movement of relative traverse between said head and said work parts in the general direction of the intended line of junction between said parts; and means for producing, in the delivery end of said rod, an additional movement favorable to a desired inclination thereof relatively to said work, said last-mentioned means comprising a pivotally supported guide, and cam means for tilting said guide during the advance of said head.

3. In a welding machine suitable for use in joining curved work parts: a welding head; means for producing a movement of relative traverse between said head and said work parts in the general direction of the intended line of junction between said parts; and means for producing an additional movement rendering the path of relative travel of said head substantially parallel with said line of junction, said head being supported by means including a guide extending in said general direction and provided with a cam, and including also a carriage movable relatively to said guide and provided with a slide which is movable on said carriage in conformity with said cam.

4. In a welding machine suitable for use in joining curved work parts: a welding head; means for producing a movement of relative traverse between said head and said work parts in the general direction of the intended line of junction between said parts; and means for producing an additional movement rendering the path of relative travel of said head substantially parallel with said line of junction, said head being supported by means including a guide extending in said general direction and provided with a cam, and also a carriage movable relatively to said guide and provided with a slide which is movable on said carriage in conformity with said cam, guides for said slide being provided on said carriage and substantially at right angles to the mentioned guide.

5. In a welding machine suitable for use in joining curved work parts: a welding head; means for producing a movement of relative traverse between said head and said work parts in the general direction of the intended line of junction between said parts; and means for producing an additional movement rendering the path of relative travel of said head substantially parallel with said line of junction, said head being supported by means including a carriage movable in said general direction and provided with a pivot arm extending at an angle from said carriage.

6. In a welding machine suitable for use in joining curved work parts: a welding head; means for producing a movement of relative traverse between said head and said work parts in the general direction of the intended line of junction between said parts; and means for producing an additional movement rendering the path of relative travel of said head substantially parallel with said line of junction, said head being supported by means including a carriage movable in said general direction and a pivot arm extending at an angle from said carriage and provided with means for fixing the inclination of said head relatively thereto.

7. In a welding machine suitable for use in joining curved work parts: a welding head; means for producing a movement of relative traverse between said head and said work parts in the general direction of the intended line of junction between said parts; and means for producing an additional movement rendering the path of relative travel of said head substantially parallel with said line of junction, said head being supported by means including a carriage movable in said general direction and a pivot arm extending at an angle from said carriage and movable relatively thereto.

8. In a welding machine suitable for use in joining curved work parts: a welding head; means for producing a movement of relative traverse between said head and said work parts in the general direction of the intended line of junction between said parts; and means for producing an additional movement rendering the path of relative travel of said head substantially parallel with said line of junction, said head being supported by means including a carriage movable in said general direction and including also a means for imparting a to-and-fro movement to said head during advance thereof in said general direction.

9. In a welding machine suitable for use in joining curved work parts: a welding head; means for producing a movement of relative traverse between said head and said work parts in the general direction of the intended line of junction between said parts; and means for producing an additional movement rendering the path of relative travel of said head substantially parallel with said line of junction, said head being supported by means including a carriage and a guide therefor, and being provided with means for varying its inclination relatively to said guide.

10. In a welding machine suitable for use in joining curved work parts: a welding head; means for producing a movement of relative traverse between said head and said work parts in the general direction of the intended line of junction between said parts; and means for producing an additional movement rendering the path of relative travel of said head substantially parallel with said line of junction, said work including parts which are symmetrically disposed, and a pair of symmetrically disposed heads being provided with like means for the movement and guidance thereof relatively to said parts.

11. In a welding machine: means for holding works parts which are curved to provide therebetween a joint along a line which varies in direction by approximately 90 degrees in a plane including a weld rod; means for automatically controlling the advance of said weld rod along said line; and means for producing a to-and-fro motion of said advancing means, corresponding to the curvature of said work in said plane, during the advance of said rod.

12. In a welding machine: means for holding work parts which are curved to provide therebetween a joint along a line which varies in direction by approximately 90 degrees in a plane including a weld rod; means for automatically controlling the advance of said weld rod along said line; and means for tilting the end of said rod incidentally to the advance thereof.

13. In a welding machine: means for holding work parts which are curved to provide therebetween a joint along a line which varies in direction by approximately 90 degrees in a plane including a weld rod; means for automatically controlling the advance of said weld rod along said line; and means for tilting the end of said rod incidentally to the advance thereof, said last mentioned means including a cam provided upon said holding means.

14. In means for holding work parts which are curved by approximately 90 degrees in a plane including a weld rod; means for automatically feeding and translationally advancing said weld rod in said plane; means for producing, during the advance of said rod, a to-and-fro motion, of said advancing means, corresponding to the curvatures of said work in said plane; and means for varying the inclination of the end of said rod, relatively to said work, incidentally to such advance.

15. A welding machine for joining curved work parts including, in combination, means for clamping the parts in fixed position with a joint therebetween following a curved path, a welding electrode, means for moving said electrode to follow the curved joint to be welded, means for spacing said electrode a predetermined distance from said joint, and means for retaining said electrode in predetermined relation to a tangent at the point of weld of said curved joint.

16. A welding machine for joining curved work parts including, in combination, means for clamping the parts in fixed position, a welding electrode, means for moving said electrode, means for automatically retaining said electrode at a predetermined distance from the joint, and means for angularly shifting said electrode so as to retain it in predetermined relation to a tangent at the point of weld as it is moved therealong.

17. A welding machine for joining curved work parts including, in combination, a welding electrode, means for advancing said electrode at a constant speed along said curved joint; and means for shifting the angular position of said electrode so that its angular relation to a tangent at the point of weld is maintained constant.

WILLIAM E. SMITH.